United States Patent
Houjou et al.

(10) Patent No.: US 9,520,100 B2
(45) Date of Patent: Dec. 13, 2016

(54) ARM-WEARABLE TERMINAL, NETWORK SERVICE SYSTEM COOPERATING WITH THE TERMINAL, DISPLAY METHOD, AND COMPUTER-READABLE STORAGE MEDIUM

(71) Applicant: CASIO COMPUTER CO., LTD., Tokyo (JP)

(72) Inventors: Yoshiharu Houjou, Tokyo (JP); Akihiro Tsukamoto, Hamura (JP)

(73) Assignee: CASIO COMPUTER CO., LTD. (JP)

( * ) Notice: Subject to any disclaimer, the term of this patent is extended or adjusted under 35 U.S.C. 154(b) by 162 days.

(21) Appl. No.: 13/950,580

(22) Filed: Jul. 25, 2013

(65) Prior Publication Data
US 2014/0028688 A1    Jan. 30, 2014

(30) Foreign Application Priority Data

Jul. 26, 2012  (JP) ................. 2012-165517

(51) Int. Cl.
*G04G 21/04* (2013.01)
*G09G 5/00* (2006.01)
(Continued)

(52) U.S. Cl.
CPC ............ *G09G 5/006* (2013.01); *G04G 9/0064* (2013.01); *G04G 21/00* (2013.01); *G04G 21/04* (2013.01);
(Continued)

(58) Field of Classification Search
None
See application file for complete search history.

(56) References Cited

U.S. PATENT DOCUMENTS

| 9,177,346 B2* | 11/2015 | Ahrens ................. G06Q 10/10 |
| 2009/0199130 A1* | 8/2009 | Tsern et al. ................... 715/810 |

(Continued)

FOREIGN PATENT DOCUMENTS

| JP | 11-095910 | 4/1999 |
| JP | 11-232013 | 8/1999 |

(Continued)

OTHER PUBLICATIONS

Japanese Office Action dated Dec. 2, 2014 for Japanese Patent Application No. 2012-165517 and English translation of the same (6 pages).

(Continued)

*Primary Examiner* — Ryan M Gray
(74) *Attorney, Agent, or Firm* — Fitch Even Tabin & Flannery LLP

(57) ABSTRACT

In a network service system, first data is uploaded from a terminal of a member to a server and second data and the first data are viewable by members. The terminal includes a display, a detector configured to detect a screen change operation in a first direction and a screen change operation in a second direction perpendicular to the first direction, and a display controller configured to successively switch and display the first data on the display when the detector detects the screen change operation in the first direction, and successively switch and display the second data when the detector detects the screen change operation in the second direction.

13 Claims, 19 Drawing Sheets

(51) Int. Cl.

| | | |
|---|---|---|
| *G06F 3/0487* | (2013.01) | |
| *G04G 21/00* | (2010.01) | |
| *G06F 1/16* | (2006.01) | |
| *G06F 3/01* | (2006.01) | |
| *G06F 3/0485* | (2013.01) | |
| *G06F 3/0488* | (2013.01) | |
| *G06F 3/0346* | (2013.01) | |
| *G04G 9/00* | (2006.01) | |
| *G04G 21/08* | (2010.01) | |

(52) U.S. Cl.
CPC .............. *G04G 21/08* (2013.01); *G06F 1/163* (2013.01); *G06F 3/014* (2013.01); *G06F 3/0346* (2013.01); *G06F 3/0485* (2013.01); *G06F 3/0487* (2013.01); *G06F 3/04883* (2013.01)

(56) References Cited

U.S. PATENT DOCUMENTS

| | | | | |
|---|---|---|---|---|
| 2011/0125866 | A1* | 5/2011 | Williams | 709/217 |
| 2011/0157046 | A1* | 6/2011 | Lee et al. | 345/173 |
| 2012/0005224 | A1 | 1/2012 | Ahrens et al. | |
| 2012/0081725 | A1* | 4/2012 | Tsukamoto | 358/1.9 |
| 2012/0154293 | A1* | 6/2012 | Hinckley et al. | 345/173 |
| 2012/0159381 | A1* | 6/2012 | Tseng | 715/784 |

FOREIGN PATENT DOCUMENTS

| | | | |
|---|---|---|---|
| JP | 2000-56897 | A | 2/2000 |
| JP | 2002-24845 | A | 1/2002 |
| JP | 2002-152327 | A | 5/2002 |
| JP | 2008-018189 | A | 1/2008 |
| JP | 2010-263578 | A | 11/2010 |
| JP | 2011-022811 | A | 2/2011 |
| JP | 2011-243003 | A | 12/2011 |
| JP | 2012-069008 | | 4/2012 |
| JP | 2012-133479 | | 7/2012 |
| WO | 2012/015919 | A1 | 2/2012 |

OTHER PUBLICATIONS

First Office Action from corresponding Japanese application No. 2012-165517 dated Jun. 3, 2014 and English translation (7 pages).
Japanese Office Action date of mailing Jul. 12, 2016 for Japanese Patent Application No. 2015-016332 and English translation of the same (7 pages).

\* cited by examiner

ARM-WEARABLE TERMINAL, NETWORK SERVICE SYSTEM COOPERATING WITH THE TERMINAL, DISPLAY METHOD, AND COMPUTER-READABLE STORAGE MEDIUM

CROSS-REFERENCE TO RELATED APPLICATIONS

This application is based upon and claims the benefit of priority from prior Japanese Patent Application No. 2012-165517, filed Jul. 26, 2012, the entire contents of which are incorporated herein by reference.

BACKGROUND OF THE INVENTION

1. Field of the Invention

The present invention relates to an arm-wearable terminal, network service system cooperating with the terminal, display method, and computer-readable storage medium.

2. Description of the Related Art

Nowadays, social network services (hereinafter abbreviated to "SNS") are popular. Originally, although SNSs were mainly enjoyed at home by using personal computers, they are increasingly enjoyed while users are out, with the spread of smartphones. In addition, wrist terminals of a wrist-watch type have appeared. Users will soon be able to join SNSs at any time, by using such wrist terminals put on their wrists. On the other hand, wrist terminals have small display areas, and thus have the problem that additional devices are needed in order to display pictures.

SNSs have various service forms, including a service of posting photographs, converting photographs into pictorial works, and displaying and viewing images of the works. In such a service, it is particularly important to display and view images, and thus the significance of the above problem that an additional device is needed for picture display is growing.

In the present circumstances, techniques of scrolling a plurality of images are common as picture display techniques. The techniques disclosed in the following Patent Documents 1 to 3 are mentioned as the scrolling techniques.

Patent Document 1, Jpn. Pat. Appln. KOKAI Pub. No. 2008-018189: A function is selected by a horizontal scrolling operation, and a menu corresponding to the function is selected by a vertical scrolling operation.

Patent Document 2, Jpn. Pat. Appln. KOKAI Pub. No. 2010-263578: Information lists in time-series order are successively displayed by a vertical scrolling operation, and personal time-series information of the selected information list is displayed by a horizontal scrolling operation for the information list.

Patent Document 3, Jpn. Pat. Appln. KOKAI Pub. No. 2011-022811: Event information is scrolled by a vertical scrolling operation, details of the event are displayed by an event selecting operation, and then information relating to the event is successively displayed by switching by a horizontal scrolling operation.

BRIEF SUMMARY OF THE INVENTION

The object of the present invention is to provide a technique of enabling the user to clearly and promptly view information provided by network services represented by SNSs, even with a terminal having a comparatively small display area.

According to the present invention, information provided by network services can be clearly and promptly viewed by the user, even with a terminal having a comparatively small display area.

According to the present invention, a network service system in which first data of first type is uploaded from a terminal of a member to a server and second data related to the first data and of second type differing from the first type and the first data are viewable by members, wherein the terminal includes a display with a screen, a detector configured to detect a screen change operation in a first direction and a screen change operation in a second direction perpendicular to the first direction, and a display controller configured to successively switch and display the first data on the display when the detector detects the screen change operation in the first direction, and successively switch and display the second data when the detector detects the screen change operation in the second direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8A and FIG. 8B are diagrams illustrating display examples of the terminal and the wrist terminal in which FIG. 8A illustrates a state in which a work is displayed on the wrist terminal, and FIG. 8B illustrates a state in which a plurality of works are displayed as a list on the smartphone terminal.

DETAILED DESCRIPTION OF THE INVENTION

Embodiments of the present invention will be explained hereinafter with reference to the drawings.

Figure 1:
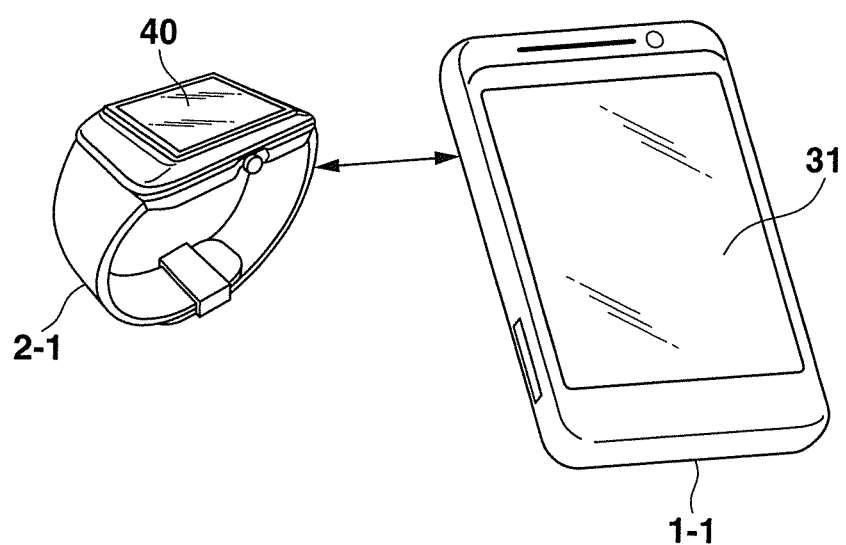
FIG. 1 is a diagram illustrating an image of a smartphone terminal and a wrist terminal.

FIG. 1 is a view illustrating a smartphone terminal 1-1 and a wrist terminal 2-1, which are used in a picture conversion system according to an embodiment of the invention. The smartphone terminal 1-1 and wrist terminal 2-1 are wirelessly connected by, for example, Bluetooth (trademark), and can exchange data. Each of the smartphone terminal 1-1 and the wrist terminal 2-1 is connectable to an SNS site 10 via the Internet 500 by, e.g. Wi-Fi. The wrist terminal 2-1 is structured in a watch shape, and includes a display 40.

Figure 2:
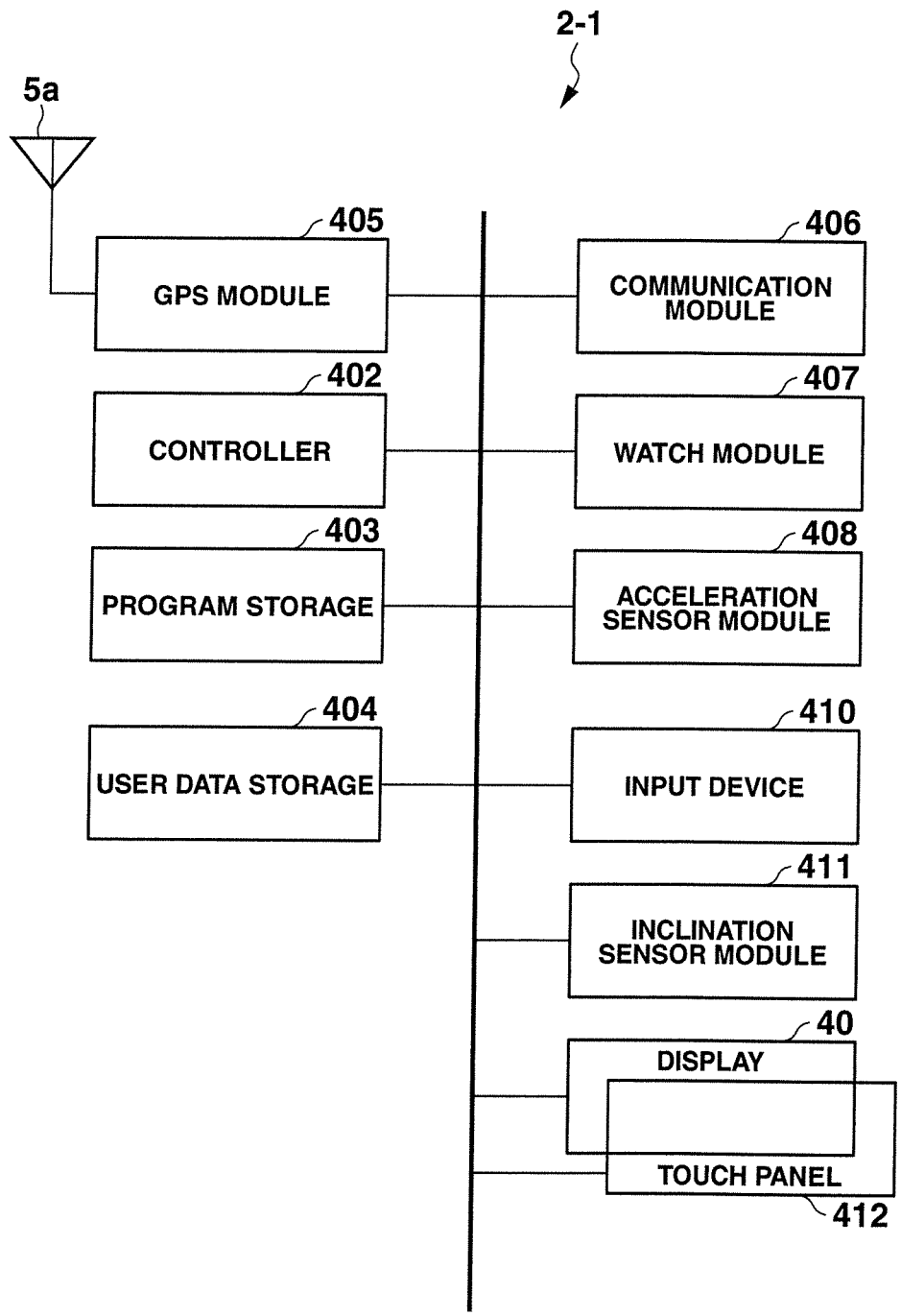
FIG. 2 is a block diagram illustrating an outline of circuit configuration of the wrist terminal.

FIG. 2 is a block diagram illustrating a circuit configuration of the wrist terminal 2-1. The wrist terminal 2-1 includes a controller 402, program storage 403, user data storage 404, a GPS module 405, a communication module 406, a watch module 407, an acceleration sensor module 408, the display 40, an input device 410, an inclination sensor module 411, and a touch panel 412.

FIG. 2 is a block diagram illustrating a circuit configuration of the wrist terminal 2-1. The wrist terminal 2-1 includes a controller 402, program storage 403, user data storage 404, a GPS module 405, a communication module 406, a watch module 407, an acceleration sensor module 408, the display 40, and an input device 410.

The GPS module 405 measures a present position by making use of a publicly known GPS (Global Positioning System). Specifically, the GPS module 405 acquires position data including a latitude and a longitude indicative of the present position, by receiving by an antenna 5a radio waves transmitted from a plurality of positioning satellites (GPS satellites), and supplies the acquired position data to the controller 402 as location information indicative of a location of action of the user.

The communication module 406 includes a wireless communication function by, e.g. Bluetooth (trademark). The communication module 406 can exchange data with the smartphone terminal 1-1 by wireless connection, and includes a function of directly connecting to the SNS site 10 by Wi-Fi.

The watch module 407 counts the present time, and supplies time data indicative of the present time to the controller 402. The watch module 407 includes a calendar function, and supplies present date data and day-of-week data to the controller 402.

Figure 14:
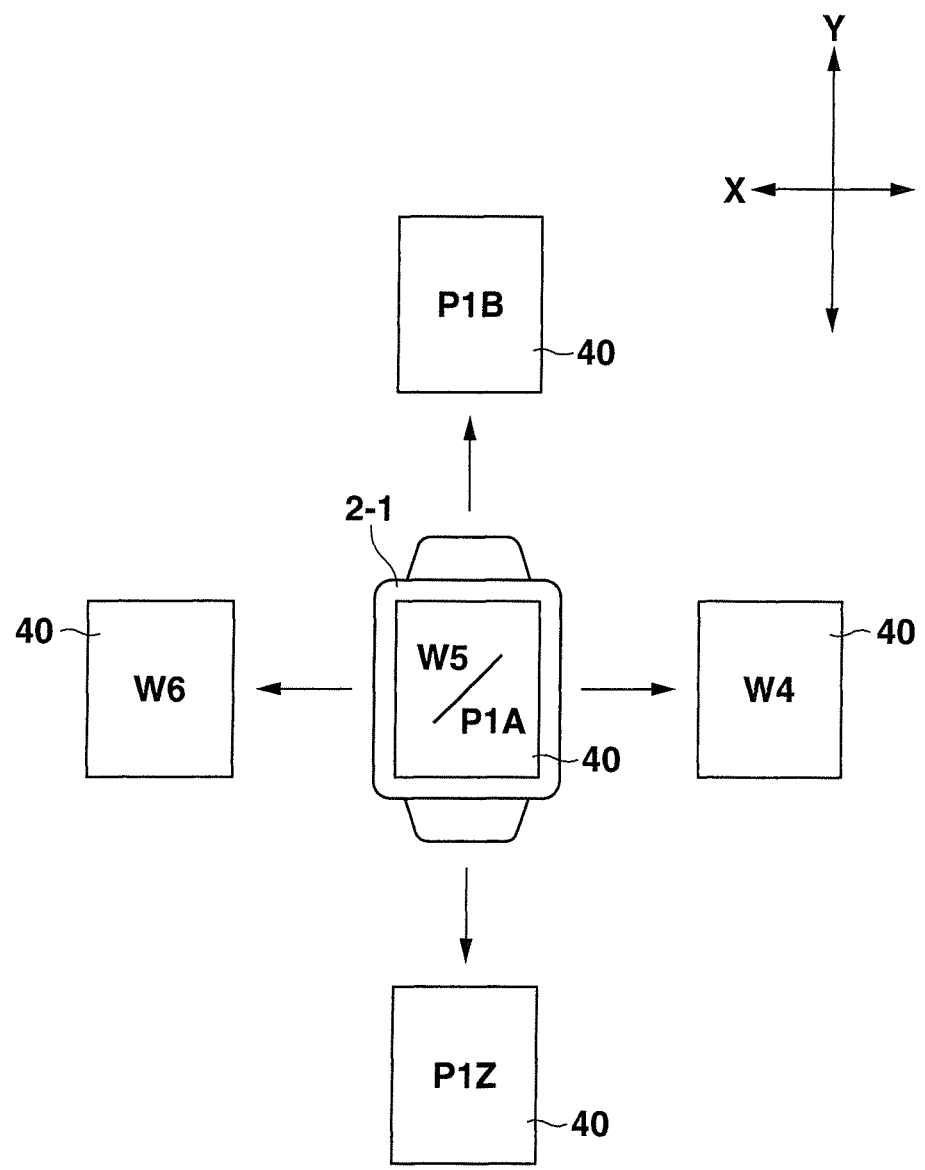
FIG. 14 is a display transition diagram of the wrist terminal in the first embodiment of the present invention.

The acceleration sensor module 408 mainly includes an acceleration sensor, an amplifier which amplifies a detection signal obtained by the acceleration sensor, and an A/D converter. The acceleration sensor module 408 supplies the controller 402 with waveform data, which indicates change in acceleration in the directions of two axes (horizontal direction (X axis) and vertical direction (Y axis) as illustrated in FIG. 14), as movement information which indicates arm-swing movement of the user.

The inclination sensor module 411 includes a sensor which detects the inclination of the wrist terminal 2-1, an amplifier which amplifies a detection signal obtained by the sensor, and an A/D converter. The inclination sensor module 411 supplies the controller 402 with waveform data, which indicates the inclination in the wrist terminal 2-1 with two axes (X axis and Y axis in FIG. 14) used as the center, as flip movement information which indicates a flip (inclining movement) for the user's wrist terminal 201.

Figure 3A:
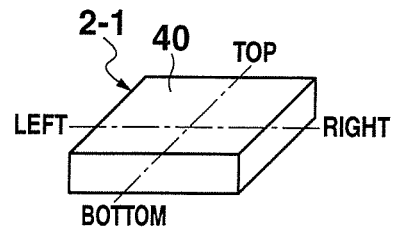
FIG. 3A, FIG. 3B, FIG. 3C, FIG. 3D, and FIG. 3E are diagrams illustrating definitions of flips.
Figure 3B:
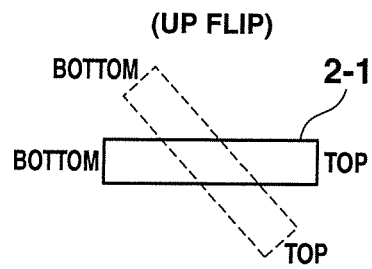

FIG. 3A to FIG. 3E are diagrams illustrating definitions of the flip movements. As illustrated in FIG. 3A, supposing that the whole wrist terminal 2-1 has a rectangular shape, the front side in the drawing is defined as "bottom", the back side is defined as "top", and the left and right end parts are defined as "left" and "right", respectively. When the "top" part is displaced below by 45 degrees or more, as illustrated by a broken line, from a horizontal state indicated by a solid line in FIG. 3B, and then returns to the horizontal state again and the movement is finished within a second, the movement is defined as "up flip".

Figure 3C:
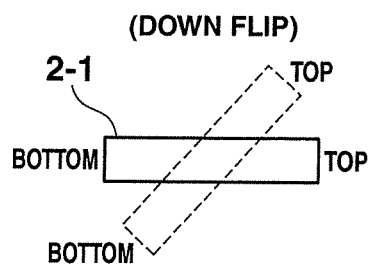

When the "bottom" part is displaced below by 45 degrees or more, as illustrated by a broken line, from a horizontal state indicated by a solid line in FIG. 3C, and then returns to the horizontal state again and the movement is finished within a second, the movement is defined as "down flip".

Figure 3D:
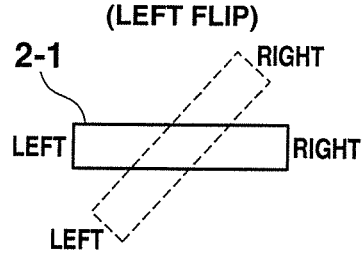

When the "left" part is displaced below by 45 degrees or more, as illustrated by a broken line, from a horizontal state indicated by a solid line in FIG. 3D, and then returns to the horizontal state again and the movement is finished within a second, the movement is defined as "left flip".

Figure 3E:
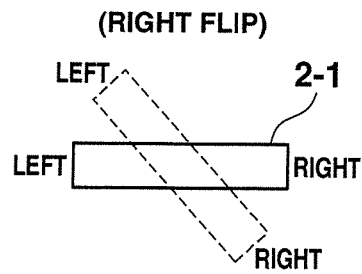

When the "right" part is displaced below by 45 degrees or more, as illustrated by a broken line, from a horizontal state indicated by a solid line in FIG. 3E, and then returns to the horizontal state again and the movement is finished within a second, the movement is defined as "right flip".

The definitions of the flips are stored in the program storage 403 in advance. The controller 402 can determine presence/absence of flips of the four directions, based on the output from the inclination sensor 411 and the definitions.

The touch panel 412 is superposed on the surface of the display 40. The touch panel 412 is a capacitive touch panel. The touch panel 412 supplies the controller 402 with flick movement information indicating a user's flick (movement of slightly flicking the surface of the touch panel 412 by the finger) in directions of two axes (horizontal direction (X direction) and vertical direction (Y axis) as illustrated in FIG. 14) on the display 40 of the wrist terminal 2-1.

Figure 4A:
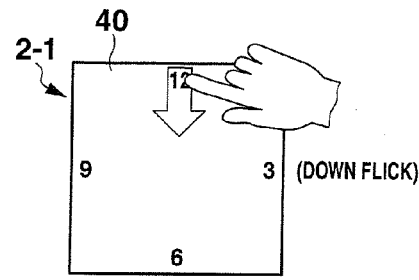
FIG. 4A, FIG. 4B, FIG. 4C, FIG. 4D, FIG. 4E, FIG. 4F, FIG. 4G, and FIG. 4H are diagrams illustrating definitions of flicks.
Figure 4E:
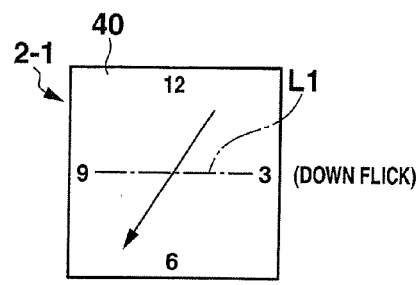
Figure 4B:
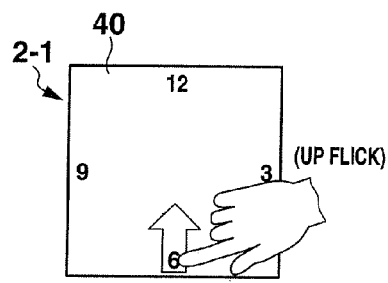
Figure 4F:
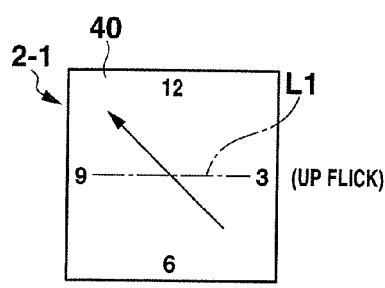
Figure 4C:
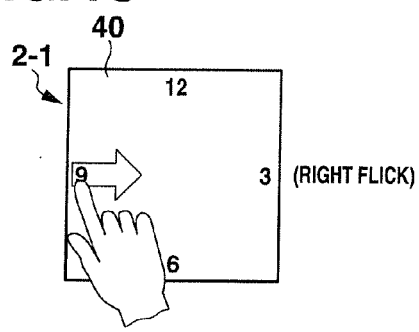
Figure 4G:
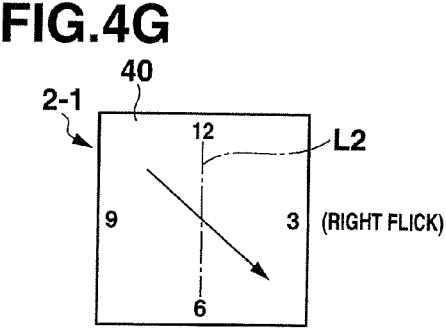
Figure 4D:
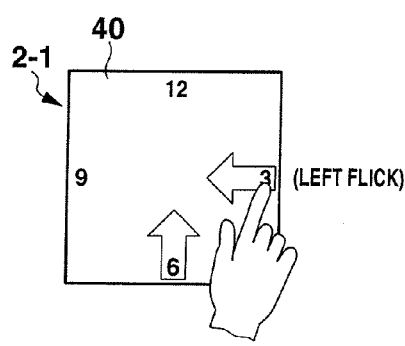

FIG. 4A to FIG. 4H are diagrams illustrating definitions of the flick movements. As illustrated in FIG. 4A, movement of sliding a user's finger from the twelve-o'clock side to the six-o'clock side on the display 40 of the wrist terminal 2-1 is defined as "down flick". As illustrated in FIG. 4B, movement of sliding user's finger from the six-o'clock side to the twelve-o'clock side is defined as "up flick". As illustrated in FIG. 4C, movement of sliding user's finger from the nine-o'clock side to the three-o'clock side is defined as "right flick". As illustrated in FIG. 4D, movement of sliding user's finger from the three-o'clock side to the nine-o'clock side is defined as "left flick".

Figure 4H:
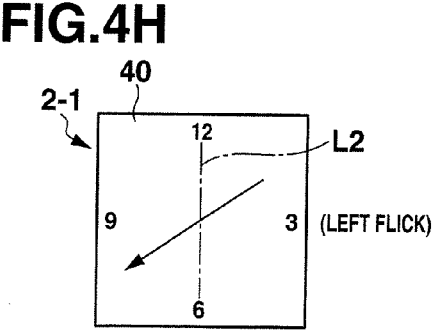

In addition, as illustrated in FIG. 4E, movement of sliding user's finger obliquely across a central horizontal axis line L1, which connects the three o'clock with the nine o'clock, from the twelve-o'clock side to the six-o'clock side is also defined as "down flick". As illustrated in FIG. 4F, movement of sliding user's finger obliquely across the central horizontal axis line L1, which connects the three o'clock with the nine o'clock, from the six-o'clock side to the twelve-o'clock side is also defined as "up flick". As illustrated in FIG. 4G, movement of sliding user's finger obliquely across a central vertical axis line L2, which connects the six o'clock with the twelve o'clock, from the nine-o'clock side to the three-o'clock side is also defined as "right flick". As illustrated in FIG. 4H, movement of sliding user's finger obliquely across the central horizontal axis line L2, which connects the six o'clock with the twelve o'clock, from the three-o'clock side to the nine-o'clock side is also defined as "right flick".

The definitions of the flicks are stored in the program storage 403 in advance. The controller 402 can determine presence/absence of flicks of the four directions, based on the output from the touch panel 412 and the definitions. Since movements of obliquely sliding the finger as illustrated in FIG. 4E to FIG. 4H are also defined as flicks, as well as movements of sliding the finger in the vertical direction or the horizontal direction as illustrated in FIG. 4A to FIG. 4D, flicks can be detected with accuracy, even when the user obliquely slides the finger in a natural posture in the case of sliding a finger of the right hand on the display 40 of the wrist terminal 2-1 put on the left arm.

Thus, the wrist terminal 2-1 in the present embodiment can detect the following movements (1), (2), and (3) in the horizontal direction (X direction) and the vertical direction (Y direction).

(1) Arm-swing movement based on the output from the acceleration sensor module 408

(2) Flipping the wrist terminal 2-1 based on the output from the inclination sensor module 411

(3) Flicking on the touch panel 412 based on the output from the touch panel 412

The program storage 403 is a ROM (Read Only Memory) or the like, which stores various programs and data which are necessary for the controller 402 (specifically, CPU) to control the wrist terminal 2-1. The programs stored in the program storage 403 include a program which causes the controller 402 to execute display transition processing illustrated in FIG. 15 and FIG. 17, as described later. The smartphone terminal 1-2 stores an application program to use the SNS site 10. The program storage 403 of the wrist terminal 2-1 stores an application program to use the SNS site 10, and the application program is lighter than the application program of the smartphone terminal 1-2.

Figure 5:
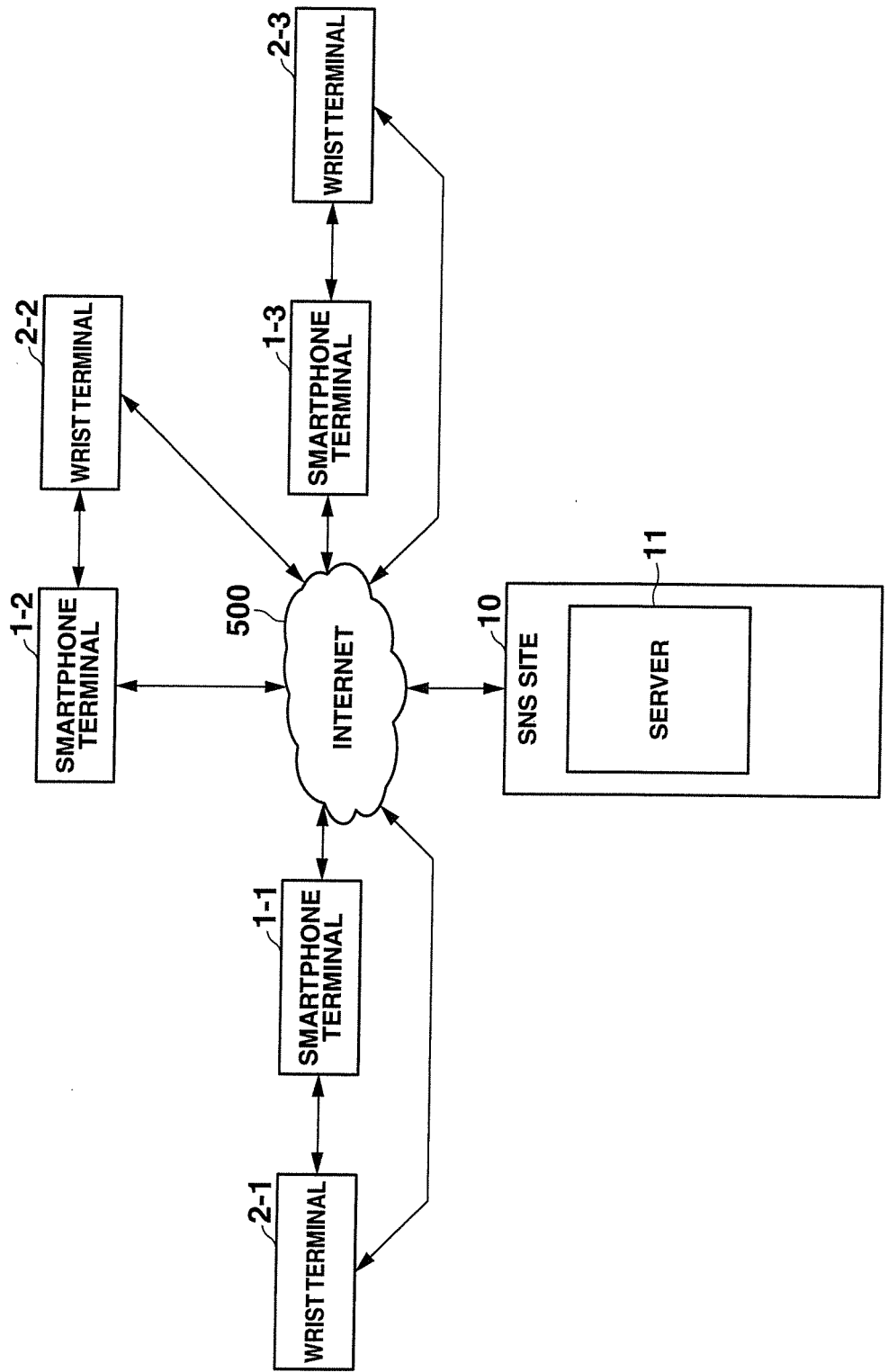
FIG. 5 is a block diagram illustrating a whole structure of an SNS system.

FIG. 5 is a block diagram illustrating the whole structure of the present embodiment. The SNS site 10 including a server 11 is connected to terminals 1-1, 1-2, 1-3 . . . of members via the Internet 500. The terminals 1-1, 1-2, 1-3, are, for instance, smartphones or personal computers. In addition, wristwatch-type wrist terminals 2-1, 2-2, 2-3 . . . which are wearable on the arms are wirelessly connected to the smartphone terminals 1-1, 1-2, 1-3, . . . .

Figure 6A:
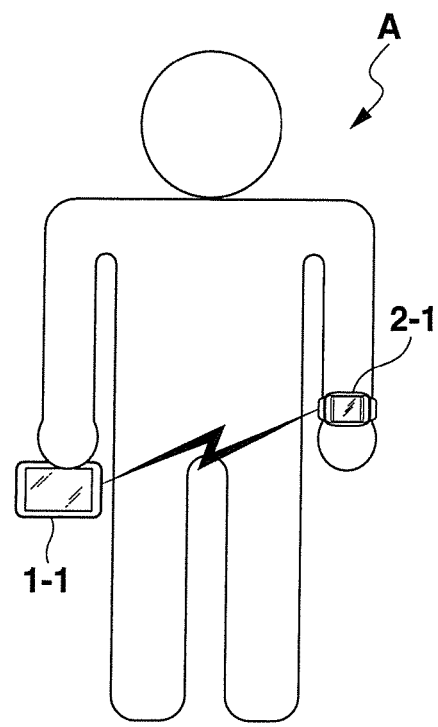
FIG. 6A and FIG. 6B are diagrams illustrating states of using the terminal and the wrist terminal.
Figure 6B:
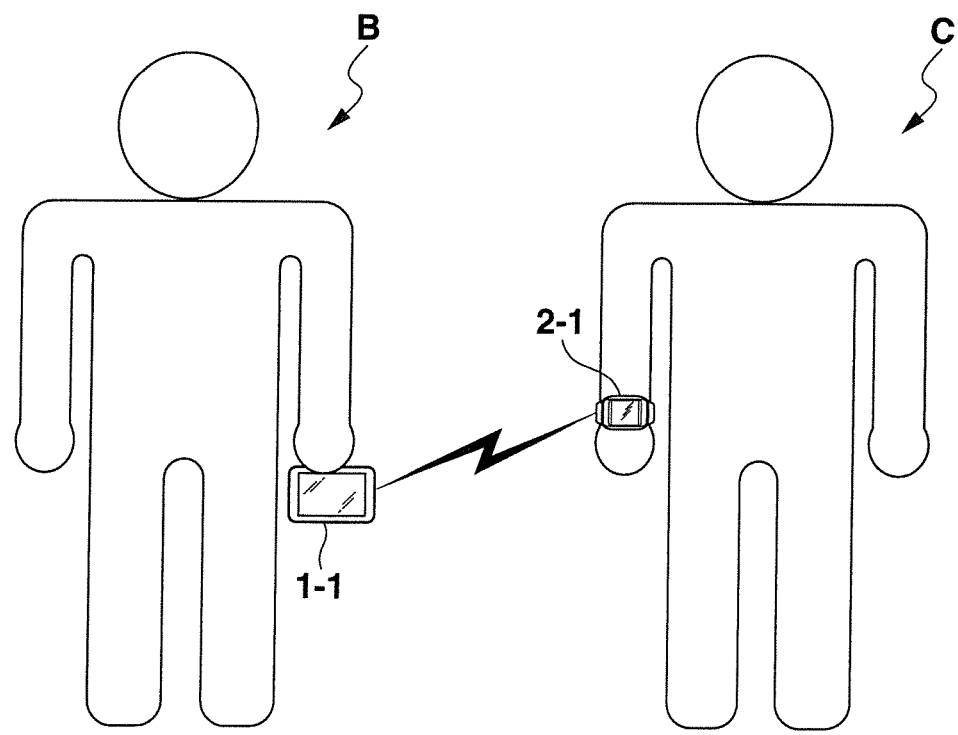

FIG. 6A and FIG. 6B illustrate modes of use of the smartphone terminal 1-1 and wrist terminal 2-1. FIG. 6A illustrates a mode of use in which member "A" possesses the smartphone terminal 1-1 and connects the smartphone terminal 1-1 to the SNS site 10 via a mobile phone network and the Internet, and also possesses the wrist terminal 2-1 and receives part of information, such as profile information of grouped members, works such as picture-type image data, or e-mails, by the wrist terminal 2-1. According to this mode of use, even if the wrist terminal 2-1 does not have a function of connection to the Internet 500, the wrist terminal 2-1 can receive, for example, profile information of friend members, e-mails, etc.

FIG. 6B illustrates another mode of use. In this mode of use, when member "B" possesses the smartphone terminal 1-1 and member "C", who does not possess the smartphone terminal 1-1, possesses the wrist terminal 2-1, if member "B" and member "C" come close to each other, data exchange is enabled between the smartphone terminal 1-1 of member "B" and the wrist terminal 2-1 of member "C". According to this mode of use, even if member "C" does not possess the smartphone terminal 1-1 which has the function of connection to the Internet 500, member "C" can obtain information which is acquired via the Internet 500.

Figure 7A:
FIG. 7A and FIG. 7B are diagrams illustrating display examples of the wrist terminal.
Figure 7B:
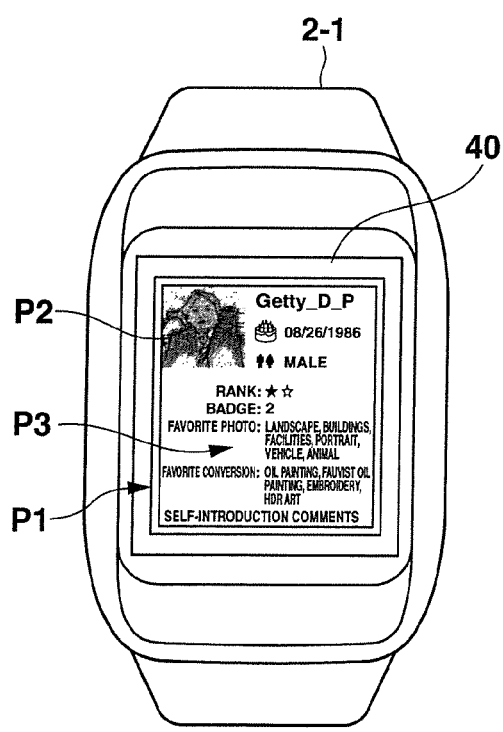

FIG. 7A and FIG. 7B illustrate display examples of the wrist terminal 2-1. Usually, as illustrated in FIG. 7A, the wrist terminal 2-1 displays time screen P4 including the present year/month/day, a day of the week, and hour/minute. By detecting that another member who is grouped has come near within a predetermined range, the profile image or works of this member who has come near are automatically be displayed, as illustrated in FIG. 7B. At the same time, notification by sound or vibration may be made.

The "within a predetermined range", in this context, means "within a predetermined distance" or "when a radio wave intensity has increased to a predetermined value or more". With the GPS being built in the wrist terminal 2-1, the position of presence and time can be specified. Thus, not only the real-time comparison, but also display such as "the member was near several minutes before" can be performed. With this wrist terminal 2-1, too, a work, which is image data converted to a picture type, can be viewed.

Thereby, even if a member puts the smartphone terminal 1-1 in a bag or the like, if the member wears the wrist terminal 2-1 as a wristwatch, the member can easily confirm the profile image of the member himself/herself, a friend member or a grouped member, or can view the work.

Figure 8A:
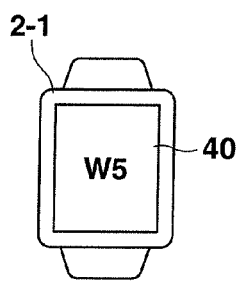
Figure 8B:
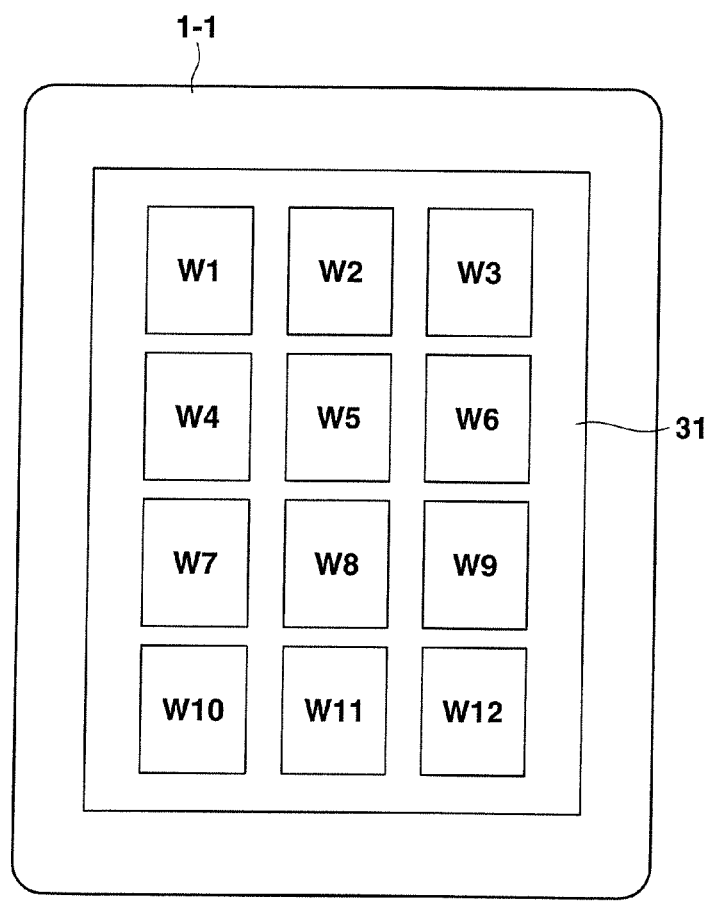

FIG. 8A and FIG. 8B are views illustrating display examples of the smartphone terminal 1-1 and wrist terminal 2-1. FIG. 8A illustrates a state in which one work is displayed on the wrist terminal 2-1. FIG. 8B illustrates a state in which a table of a plurality of works are displayed on the smartphone terminal 1-1. Specifically, FIG. 8B illustrates a state in which a table of thumbnails W1 to W12 of 12 works are displayed on a display 31 of the smartphone terminal 1-1. FIG. 8A illustrates a state in which one of the thumbnails W1 to W12, for example, thumbnail W5, is displayed on the display 40 of the wrist terminal 2-1.

The display area of the display 31 of the smartphone terminal 1-1 differs from the display area of the display 40 of the wrist terminal 2-1. The display area of the display 40 of the wrist terminal 2-1 is smaller than the display 31 of the smartphone terminal 1-1.

The wrist terminal 2-1 displays the thumbnail W5 of one work, and the smartphone terminal 1-1 displays the thumbnails W1 to W12 of 12 works, centering on the thumbnail W5 of the one work. The display of the smartphone terminal 1-1 is an arbitrary one, for example, display in an order beginning with the latest work, display of works of the same member, display of works of the same picture type, or random display.

The details of the SNS site 10 will be described.

Figure 9:
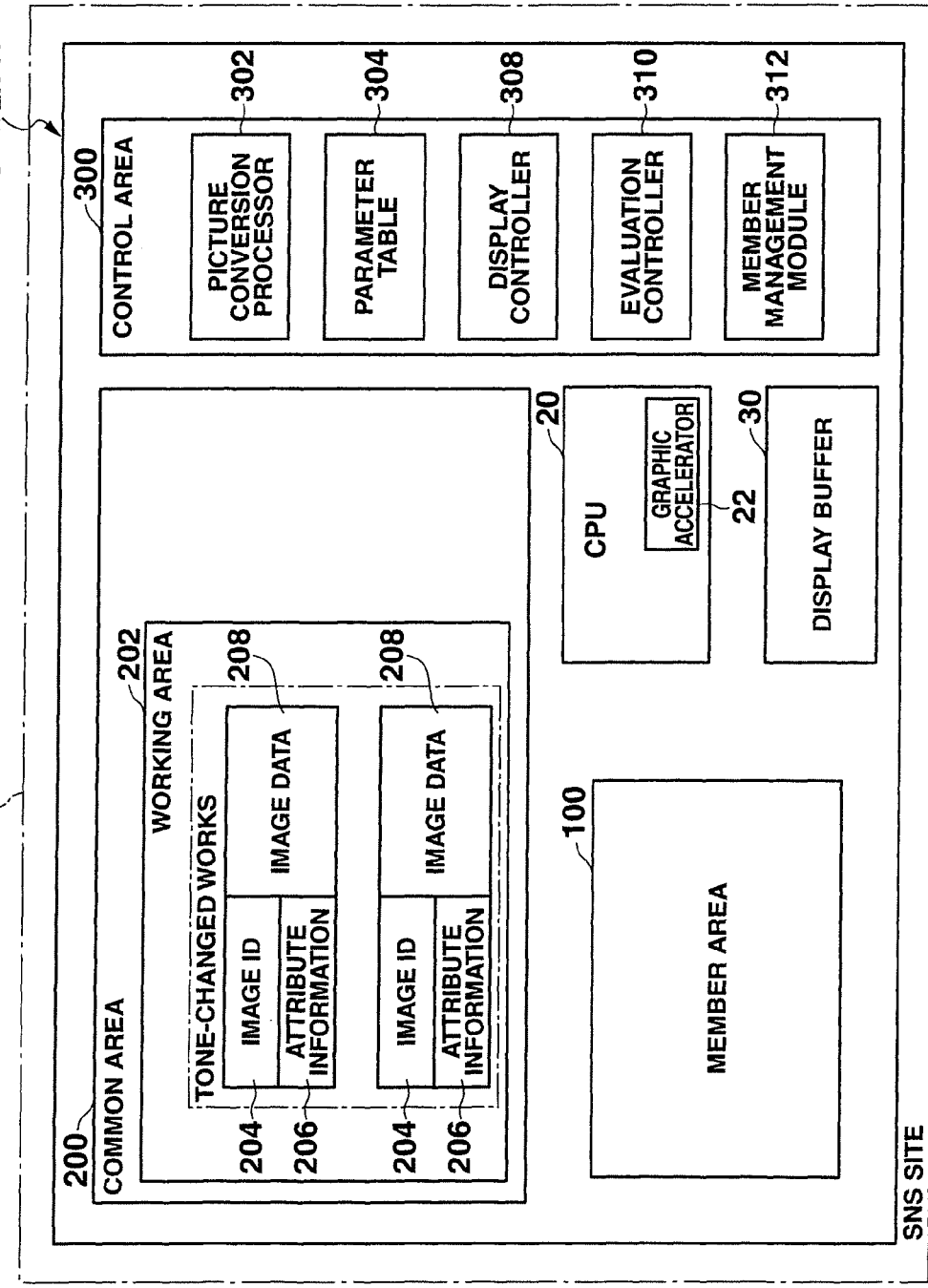
FIG. 9 is a block diagram illustrating a main part of a structure of a server which provides an SNS site.
Figure 10:
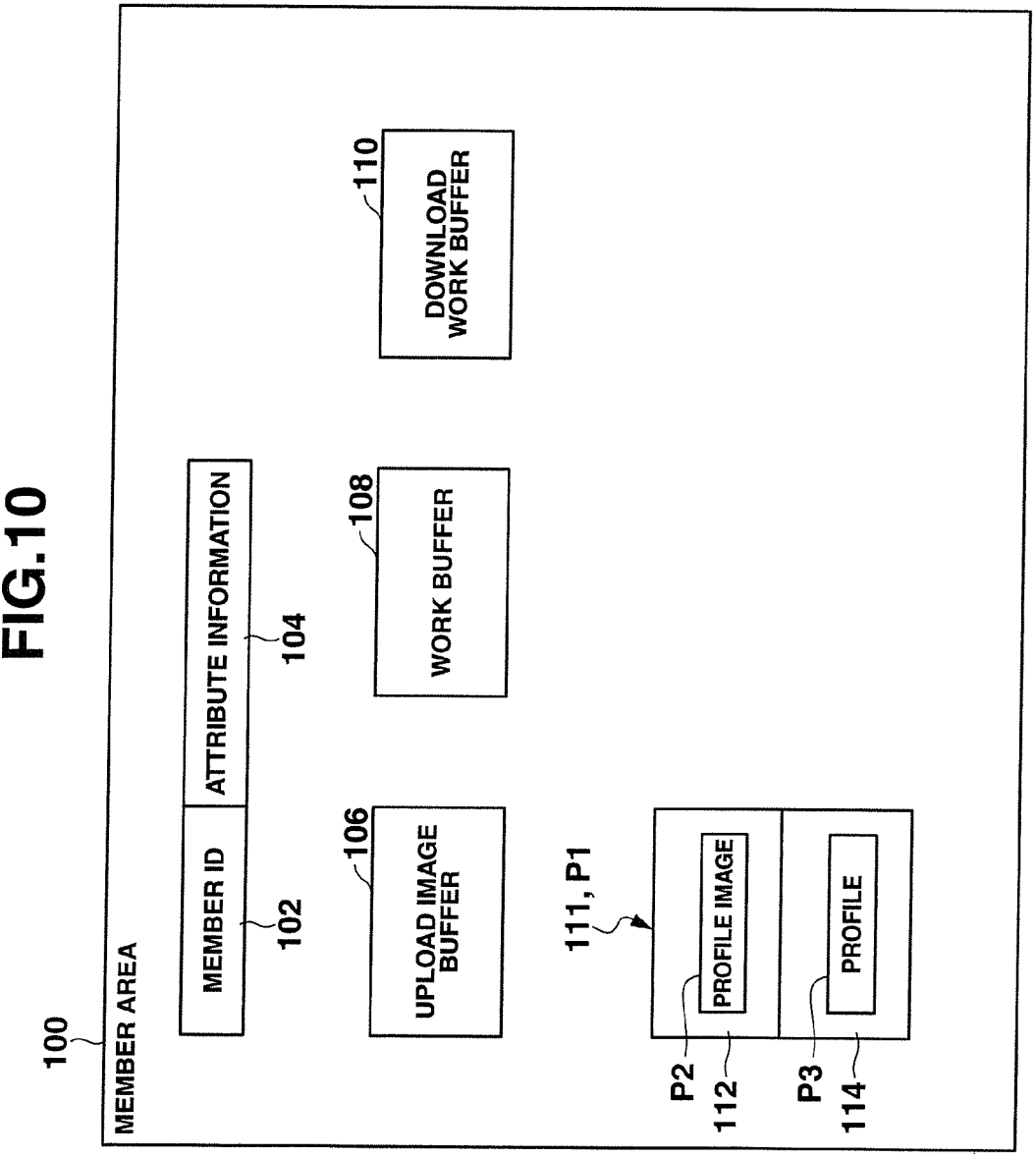
FIG. 10 is a block diagram illustrating details of a member area.
Figure 11:
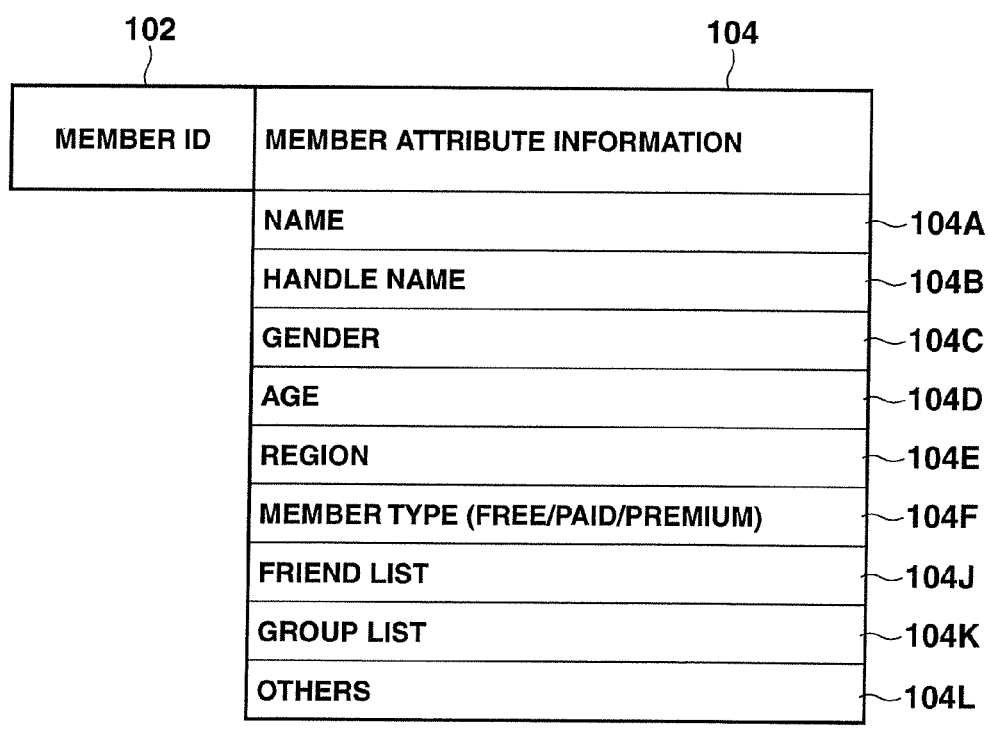
FIG. 11 is a diagram illustrating contents of member property information.
Figure 12:
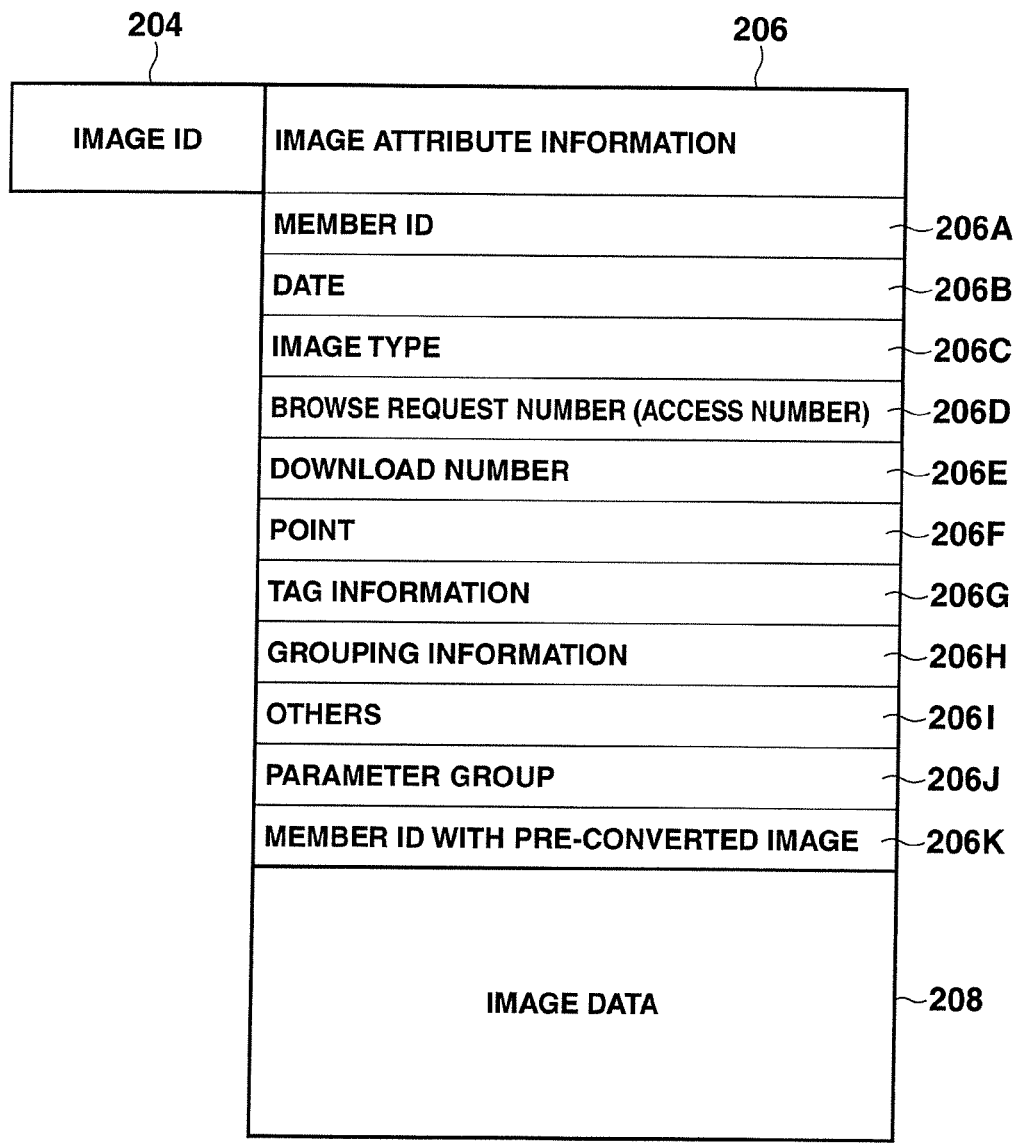
FIG. 12 is a diagram illustrating contents of image property information.

FIG. 9 is a block diagram illustrating a main part of the structure of the server 11 which realizes the SNS site 10. FIG. 10 is a block diagram illustrating the details of a member area. FIG. 11 is a view illustrating contents of member attribute information. FIG. 12 is a view illustrating contents of image attribute information.

As illustrated in FIG. 9, the server 11 includes a member area 100, a common area 200 and a control area 300.

As illustrated in detail in FIG. 10, the member area 100 is an area which is provided for each registered member, and stores a member ID 102 for identifying the member, and various member attribute information 104 of each member in association with the member ID 102.

The member attribute information 104 includes, for example, as shown in FIG. 11, a name 104A, a handle name 104B, a gender 104C, an age 104D, a region 104E, a member type 104F, a friend list 140J, a group list 104K, and others 104L. The member type 104F includes a free member who is simply registered for free, a paid member who is registered with payment, or a premium member who paid a special membership fee.

The member area 100 (FIG. 10) includes an upload image buffer 106 in which image data of photos uploaded by the member is stored, a work buffer 108 in which picture-tone images (works), which have been picture-converted in the SNS site 10, are stored, a download work buffer 110 which stores downloaded works of other members, and a profile image storage 111. The profile image storage 111 includes a profile image storage 112 storing profile image P2 of the member and a profile storage 114 storing his/her profile P3.

The common area 200 in FIG. 9 is an area which is provided common to all members. The common area 200 includes a working area 202 in which many picture-converted or tone-changed works, which were created by changing a tone of the images uploaded by members to different tones, are stored.

Each of works stored in the working area 202 includes image data 208, an image ID 204 for identifying the work, and image attribute information 206 indicative of the attribute of each image.

As shown in FIG. 12, the image attribute information 206 includes a member ID 206A indicative of the poster of the work, date information 206B of, e.g. a date of creation or a date of posting, image type information 206C such as a size of image data and type of picture tone, browse request number (access number) information 206D indicative of the number of times of browsing of the work, download number information 206E indicative of the number of times of download of the work, point information 206F indicative of the evaluation of the work, tag information 206G for attaching a tag indicating what the work relates to, such as a person, nature, flower, morning glory, etc., grouping information 206H indicative of a group if the work belongs to the group, and other information 206I which is unique to the work. These information items are stored together with the image ID 204 and image data 208.

From the member ID 206A, the creator of the work is understood, and it can be determined whether the creator is a free member, a paid member or a premium member. In addition, from the tag information 206G, the work can be categorized. Furthermore, from the grouping information 206H, the work can be grouped. The category is based on an objective division and includes a category of oil painting, a category of HDR (High Dynamic Range), or the like.

The original image data or tone-changed image data posted by another member may be subjected to a further picture conversion. For that reason, the image attribute information 206 further includes a member ID with an original (pre-tone-changed) image 206K and parameter group information used for tone change 206J. A further tone-changed image may be unnatural if the tone-changed image is subjected to a further picture conversion. In order to prevent this further conversion, an allowable picture type to which the tone-changed image is further changed can be determined base on the parameter group information 206J.

The control area 300 shown in FIG. 9 includes a picture conversion processor 302, a parameter table 304, a display controller 308, an evaluation controller 310, and a member management module 312.

The picture conversion processor 302 executes a picture conversion process for changing a tone of image data, which is stored in the upload image buffer 106, to another tone. The parameter table 304 stores parameters for picture conversion, which are referred to when the picture conversion process is executed. The display controller 308 stores a control program for displaying the work on the display.

The evaluation controller 310 evaluates the works, which are stored in the work buffer 108 of the member area 100, in accordance with the number of times of access, and gives points to each work. The member management module 312 manages the members by the member IDs, and controls respective services for the free member, paid member and premium member. The member management module 312 also controls the SNS function of the SNS site 10.

In addition, the server 11 includes a CPU 20 and a display buffer 30. The CPU 20 controls the entirety of the server 11, based on various control programs stored in the control area 300, and executes various processes which are necessary for displaying many works in a table format on the Internet. The CPU 20 includes a graphic accelerator 22 for executing a high-level graphic process. By the graphic accelerator 22, images can be categorized and displayed, as will be described later, by simply designating some conditions from driver software. In the meantime, the above-described driver software is, for example, a publicly known open GL with a high general-purpose applicability and an extension library for using the open GL.

The display buffer 30 is a working memory for buffering images for display, when the CPU 20 displays many works in a table format.

Figure 13:
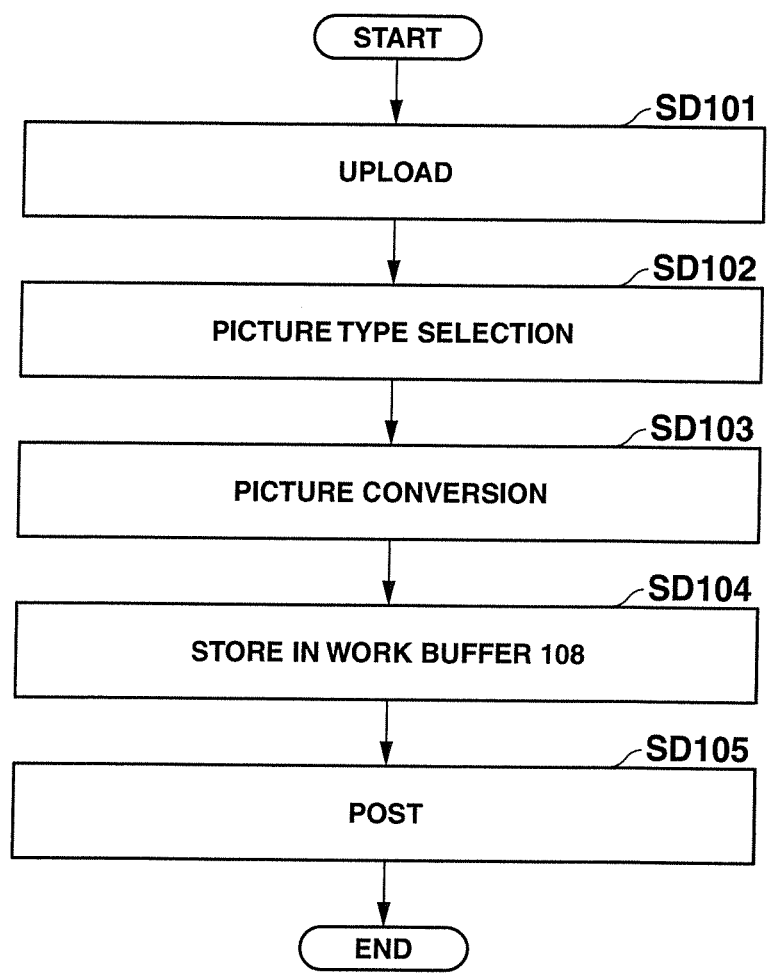
FIG. 13 is a flowchart illustrating a process of uploading and posting.

FIG. 13 is a flowchart illustrating the process procedure of an upload/posting process.

The server 11 accepts upload of an image (photo) from a member terminal, and stores the image (photo) in the upload image buffer 106 (step SD101). In addition, the server 11 selects the picture type for conversion, in accordance with a selection instruction from the member terminal (step SD102). Using the selected type, the server 11 executes picture conversion of the uploaded image (step SD103).

Thereafter, the tone-changed image, which has been picture-converted in step SD103, is stored in the work buffer 108 (step SD104). When the image is posted, the image is moved to the working area 202 (step SD105). In addition, as the image attribute information 206, the member ID 206A indicative of the poster of the work and the date information 206B indicative of, e.g. the date of posting are written.

First Embodiment

Figure 15:
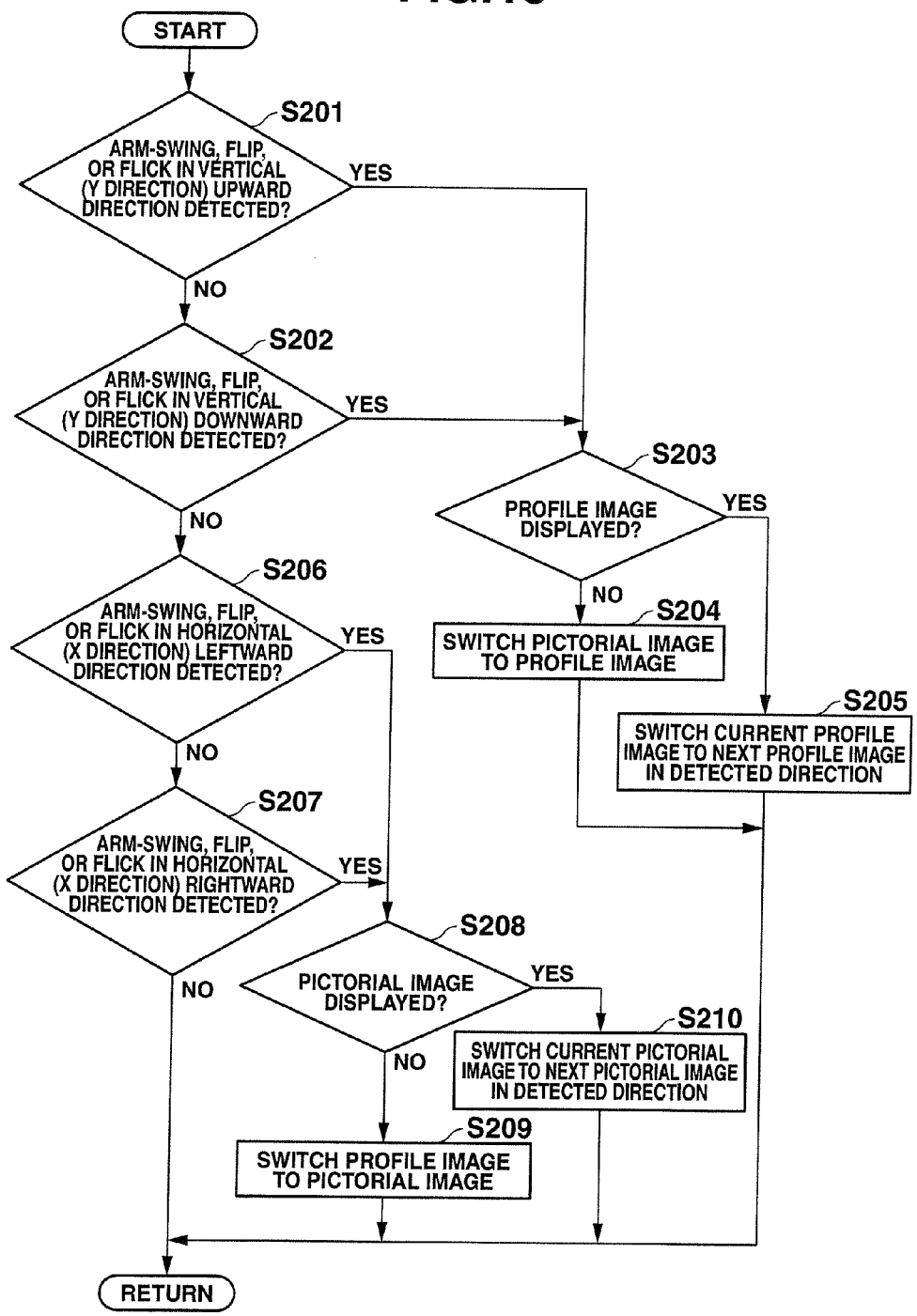
FIG. 15 is a flowchart illustrating a process according to the first embodiment.

FIG. 14 is a diagram illustrating display examples of the wrist terminal 2-1 according to the first embodiment of the present invention, and FIG. 15 is a flowchart illustrating a process performed by the wrist terminal 2-1 in the first embodiment.

As shown in the center of FIG. 14, the display 40 of the wrist terminal 2-1 displays a pictorial image W5 which is a pictorial image work. In this state, the controller 402 executes processing as illustrated in the flowchart of FIG. 15, in accordance with a program stored in the program storage 403.

Specifically, the controller 402 determines whether any of arm-swing, flip, and flick in a vertical (Y direction in FIG.

14) upward direction has been detected or not (Step S201), or any of arm-swing, flip, and flick in a vertical (Y direction in FIG. 14) downward direction has been detected or not (Step S202), based on the outputs from the acceleration sensor module 408, the inclination sensor module 411, and the touch panel 412.

When any of arm-swing, flip, and flick in the Y direction is detected, it is determined whether the image displayed at present on the display 40 is a profile image or not (Step S203). When the image displayed at present on the display 40 is a pictorial image, not a profile image (Step S203; NO), the pictorial image is switched to the profile image of the member who owns the pictorial image (Step S204).

Thus, in the state where the pictorial image W5 is displayed on the display 40 as illustrated in FIG. 14, when the user swings the arm wearing the wrist terminal 2-1 in the Y direction, inclines the arm in the Y direction, or performs an operation of flicking the surface of the display 40 in the Y direction by the finger, the picture of the display 40 is changed from the pictorial image W5 to a profile image P1A, as illustrated in the center of FIG. 14.

When the image displayed at present on the display 40 is a profile image (Step S203; YES), the profile image is switched to a next profile image in the detected direction (Step S205).

Thus, in the state where the profile image P1A is displayed on the display 40, when the user swings the arm wearing the wrist terminal 2-1 in the Y direction upward, inclines the arm in the Y direction upward, or performs the operation of flicking the surface of the display 40 in the Y direction upward by the finger, the picture of the display 40 is changed from the profile image P1A to a next profile image P1B, as illustrated in the upper part of FIG. 14. In the state where the profile image P1A is displayed on the display 40, when the user swings the arm wearing the wrist terminal 2-1 in the Y direction downward, inclines the arm in the Y direction downward, or performs the operation of flicking the surface of the display 40 in the Y direction downward by the finger, the picture of the display 40 is changed from the top profile image P1A to the last profile image P1Z, as illustrated in the lower part of FIG. 14.

Further, the controller 402 determines whether any of arm-swing, flip, and flick in a horizontal (X direction in FIG. 14) leftward direction has been detected or not (Step S206), or any of arm-swing, flip, and flick in a horizontal (X direction in FIG. 14) rightward direction has been detected or not (Step S207), based on the outputs from the acceleration sensor module 408, the inclination sensor module 411, and the touch panel 412.

When any of arm-swing, flip, and flick in the X direction is detected, it is determined whether the image displayed at present on the display 40 is a pictorial image or not (Step S208). When the image displayed at present on the display 40 is a profile image, not a pictorial image (Step S208; NO), the profile image is switched to a pictorial image which is held by the member of the profile image (Step S209).

Thus, in the state where the profile image P1A is displayed on the display 40, when the user swings the arm wearing the wrist terminal 2-1 in the X direction, inclines the arm in the X direction, or performs the operation of flicking the surface of the display 40 in the X direction by the finger, the picture of the display 40 is changed from the profile image P1A to the pictorial image W5, as illustrated in the center part of FIG. 14.

When the image displayed at present on the display 40 is a pictorial image (Step S208; YES), the pictorial image is switched to a next pictorial image in the detected direction (Step S210).

Thus, in the state where the pictorial image W5 is displayed on the display 40, when the user swings the arm wearing the wrist terminal 2-1 in the X direction leftward, inclines the arm in the X direction leftward, or performs the operation of flicking the surface of the display 40 in the X direction leftward by the finger, the picture of the display 40 is changed from the pictorial image W5 to a next pictorial image W6, as illustrated in the left part of FIG. 14.

In addition, in the state where the pictorial image W5 is displayed on the display 40, when the user swings the arm wearing the wrist terminal 2-1 in the X direction rightward, inclines the arm in the X direction rightward, or performs the operation of flicking the surface of the display 40 in the X direction rightward by the finger, the picture of the display 40 is changed from the pictorial image W5 to the previous pictorial image W4, as illustrated in the right part of FIG. 14.

Thus, in an SNS, the user can clearly and promptly view information provided by the SNS service, such as members' profiles and members' works, even with a terminal having a relatively small display area, such as the wrist terminal 2-1.

Second Embodiment

Figure 16:
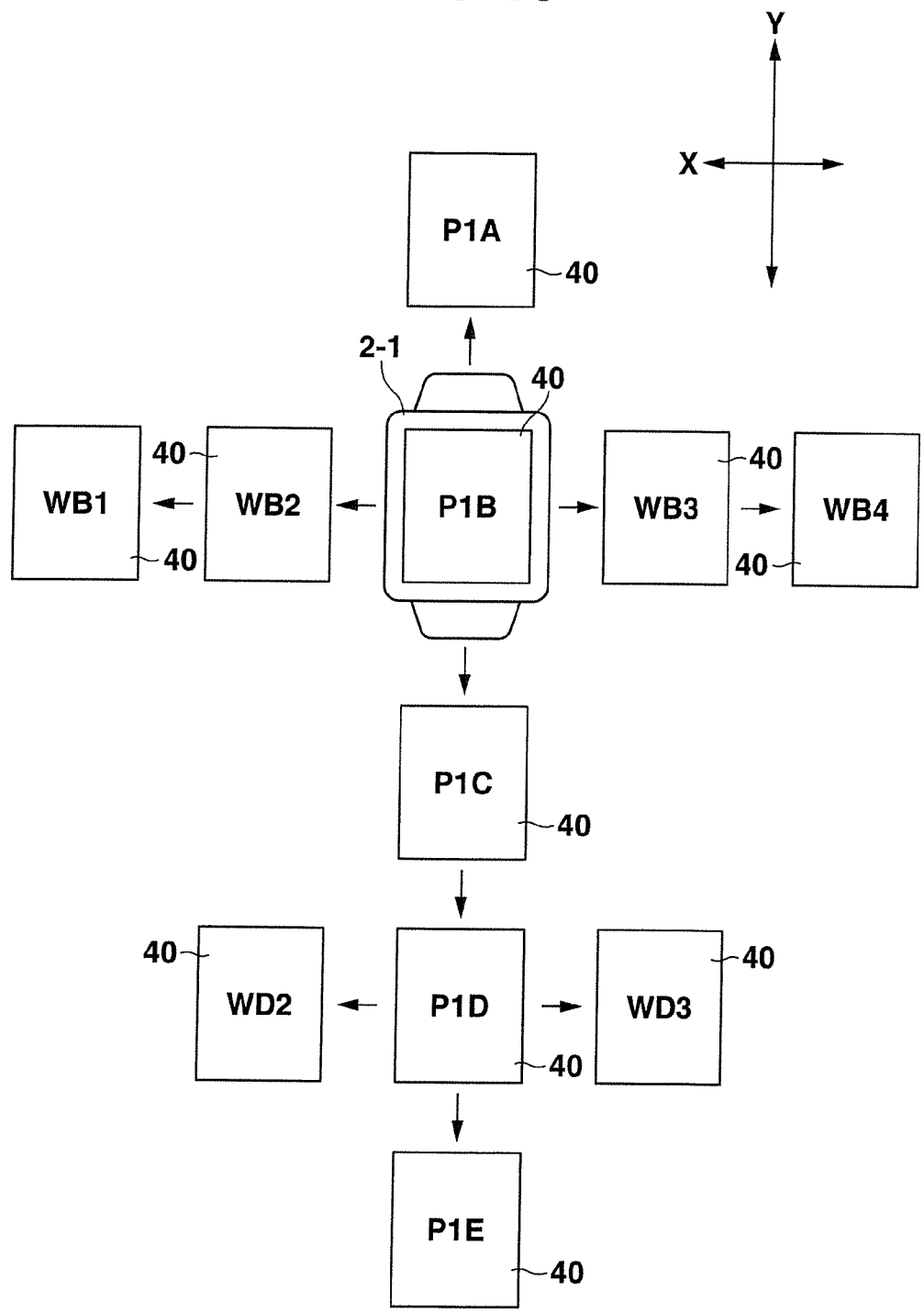
FIG. 16 is a display transition diagram of a wrist terminal according to the second embodiment of the present invention.
Figure 17:
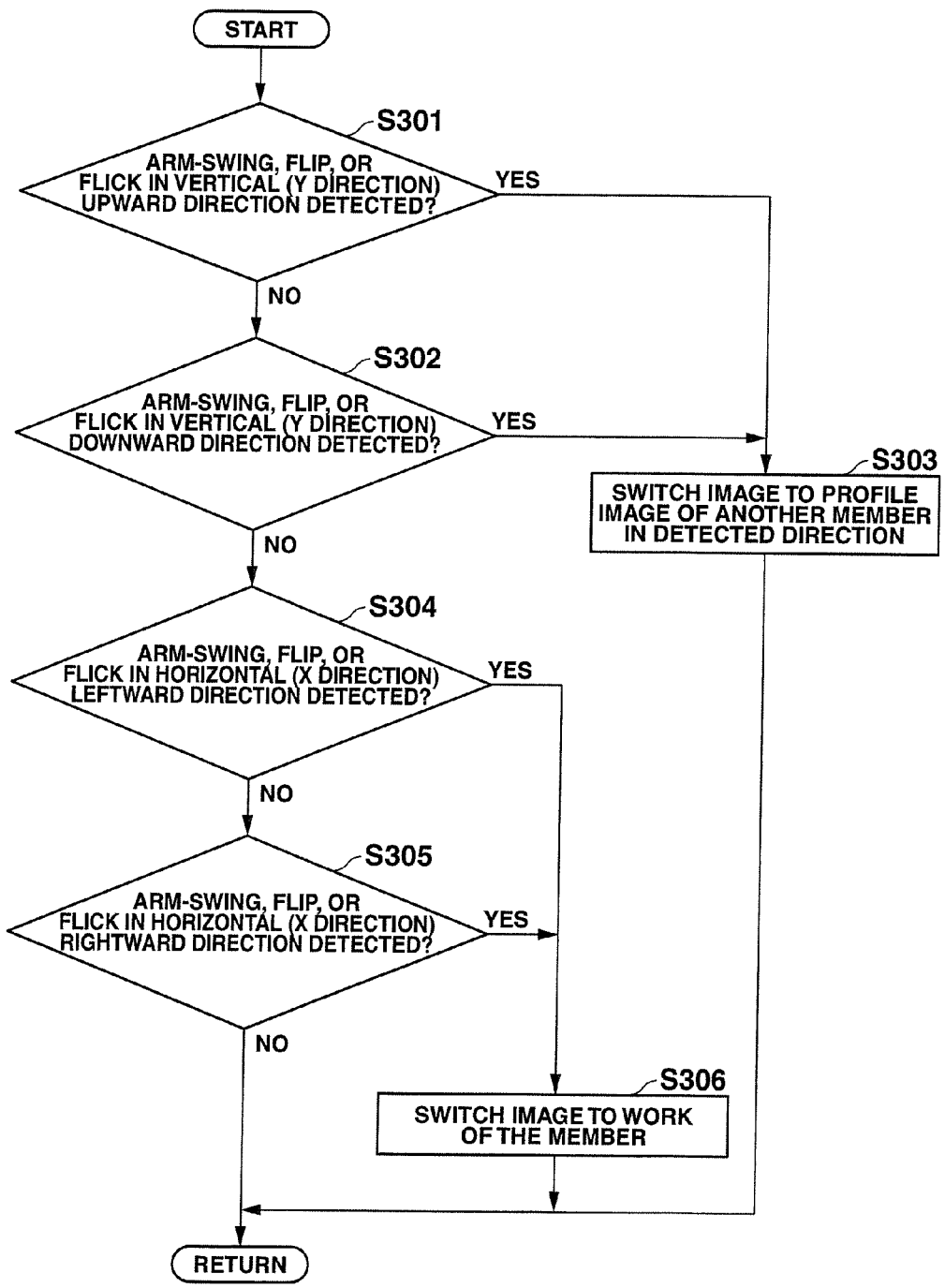
FIG. 17 is a flowchart illustrating a process according to the second embodiment.

FIG. 16 is a diagram illustrating display examples of the wrist terminal 2-1 according to the second embodiment of the present invention. FIG. 17 is a flowchart illustrating a process performed by the wrist terminal 2-1 in the second embodiment.

As shown in the center of FIG. 16, the display 40 of the wrist terminal 2-1 displays a profile image P1B of the member B. In this state, the controller 402 executes processing as illustrated in the flowchart of FIG. 17, in accordance with a program stored in the program storage 403.

Specifically, the controller 402 determines whether any of arm-swing, flip, and flick in a vertical (Y direction in FIG. 16) upward direction has been detected or not (Step S301), or any of arm-swing, flip, and flick in a vertical (Y direction in FIG. 16) downward direction has been detected or not (Step S302), based on the outputs from the acceleration sensor module 408, the inclination sensor module 411, and the touch panel 412.

When any of arm-swing, flip, and flick in the Y direction is detected, the profile image displayed at present on the display 40 is switched to a profile image of another member in accordance with the detected direction (Step S303). Thus, in the state where the profile image P1B of the member B is displayed on the display 40 as illustrated in the center part of FIG. 16, when the user swings the arm wearing the wrist terminal 2-1 in the Y direction upward, inclines the arm in the Y direction upward, or performs the operation of flicking the surface of the display 40 in the Y direction upward by the finger, the picture of the display 40 is changed from the profile image P1B of the member B to a profile image P1A of the member A.

In addition, in the state where the profile image P1B of the member B is displayed on the display 40 as illustrated in the center part of FIG. 16, when the user swings the arm wearing the wrist terminal 2-1 in the Y direction downward, inclines the arm in the Y direction downward, or performs the operation of flicking the surface of the display 40 in the Y direction downward by the finger, the picture of the display 40 is changed from the profile image P1B of the member B to a profile image P1C of the member C. When the user successively swings the arm wearing the wrist terminal 2-1 in the Y direction downward, inclines the arm in the Y direction downward, or performs the operation of flicking the surface of the display 40 in the Y direction downward by the finger, the picture of the display 40 is changed from the profile image P1C of the member C to a profile image P1D of the member D, and then to a profile image P1E of the member E.

In addition, the controller 402 determines whether any of arm-swing, flip, and flick in a horizontal (X direction in FIG. 16) leftward direction has been detected or not (Step S304), or any of arm-swing, flip, and flick in a horizontal (X direction in FIG. 16) rightward direction has been detected or not (Step S305), based on the outputs from the acceleration sensor module 408, the inclination sensor module 411, and the touch panel 412.

When any of arm-swing, flip, and flick in the X direction is detected, the displayed profile image is switched to a work of the member in the detected direction (Step S306). Thus, in the state where the profile image P1B of the member B is displayed on the display 40 as illustrated in the center part of FIG. 16, when the user swings the arm wearing the wrist terminal 2-1 in the X direction leftward, inclines the arm in the X direction leftward, or performs the operation of flicking the surface of the display 40 in the X direction leftward by the finger, the picture of the display 40 is changed from the profile image P1B of the member B to a pictorial image WB2, which is a work of the member B.

In addition, when the user successively swings the arm wearing the wrist terminal 2-1 in the X direction leftward, inclines the arm in the X direction leftward, or performs the operation of flicking the surface of the display 40 in the X direction leftward by the finger, the display 40 changes display from the pictorial image WB2 to a pictorial image WB1, which is a work of the member B. Conversely, when the user successively swings the arm wearing the wrist terminal 2-1 in the X direction rightward, inclines the arm in the X direction rightward, or performs the operation of flicking the surface of the display 40 in the X direction rightward by the finger, the display 40 successively displays pictorial images WB3 and WB4 in this order, which are works of the member B and successively switched from one to another.

Thus, pictorial images WB1, WB2, WB3, and WB4 being works of the member B can be displayed, by performing one of arm-swing, flip, and flick in the state where the profile image P1B of the member B is displayed as illustrated in the center part of FIG. 16. In addition, pictorial images WD2, and WD3 being works of the member D can be displayed, by performing one of arm-swing, flip, and flick in the state where the profile image P1D of the member D is displayed.

Thus, in an SNS, the user can clearly and promptly view information provided by the SNS service, such as members' profiles and members' works, even with a terminal having a relatively small display area, such as the wrist terminal 2-1.

In addition, different types of data items can be easily and successively displayed and scrolled by flicks and flips, while the terminal is kept on the user's arm.

Further, works of a member whom the user likes can be successively displayed and scrolled, while profiles of members are successively displayed and scrolled. Thus, the user can enjoy works, while imagining the personality of the member from the member's profile.

In addition, as described above, the communication module 406 of the wrist terminal 2-1 can connect with the smartphone terminal 1-1 in a wireless manner and exchange data with the smartphone terminal, and has a function of connecting to the SNS site 10 through the Internet 500 by Wi-Fi. Thus, the communication module 406 can receive data of a large volume through the smartphone terminal 1-1, and receive data of a small volume directly from the server 11. This structure enables the user to enjoy the SNS with only the wrist terminal 2-1, without having to carry the smartphone terminal 1-1 as well.

Third Embodiment

Figure 18:
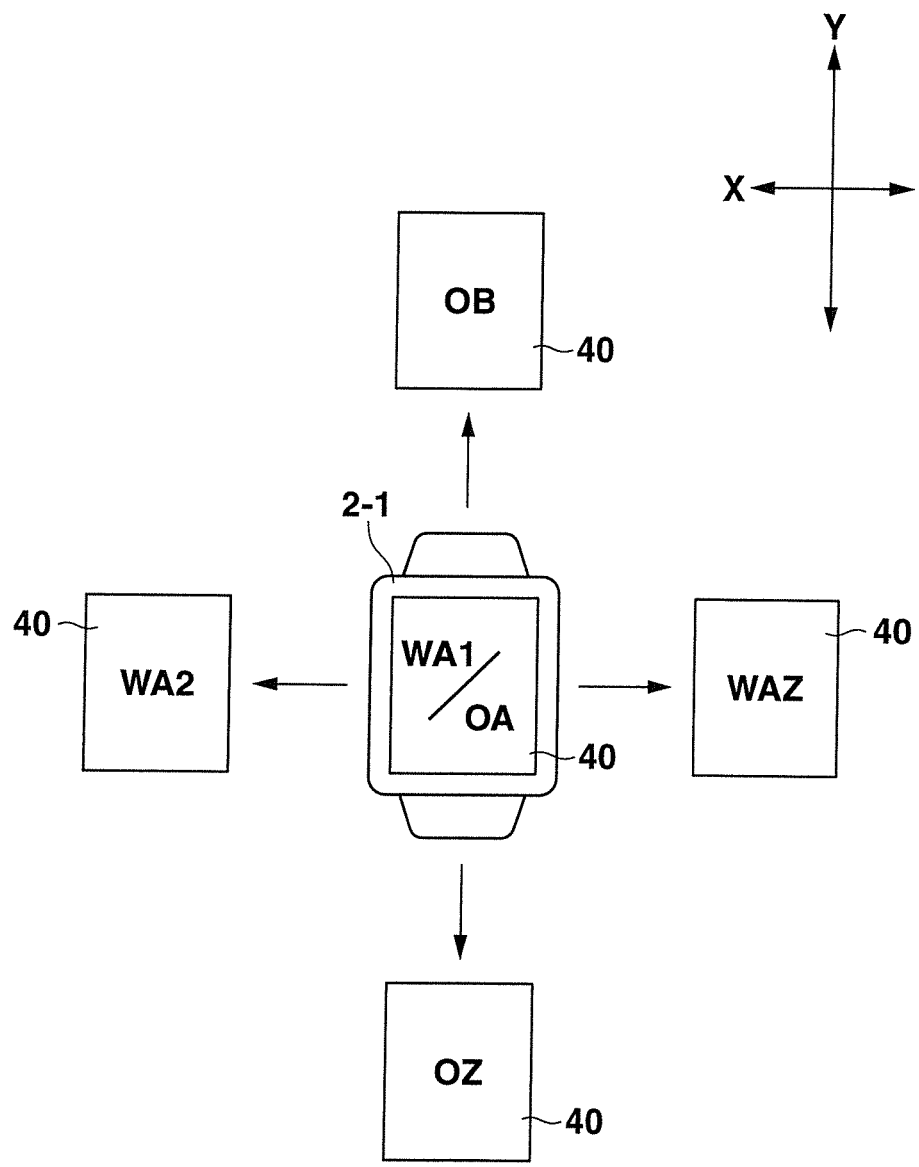
FIG. 18 is a display transition diagram of a wrist terminal according to the third embodiment of the present invention.
Figure 19:
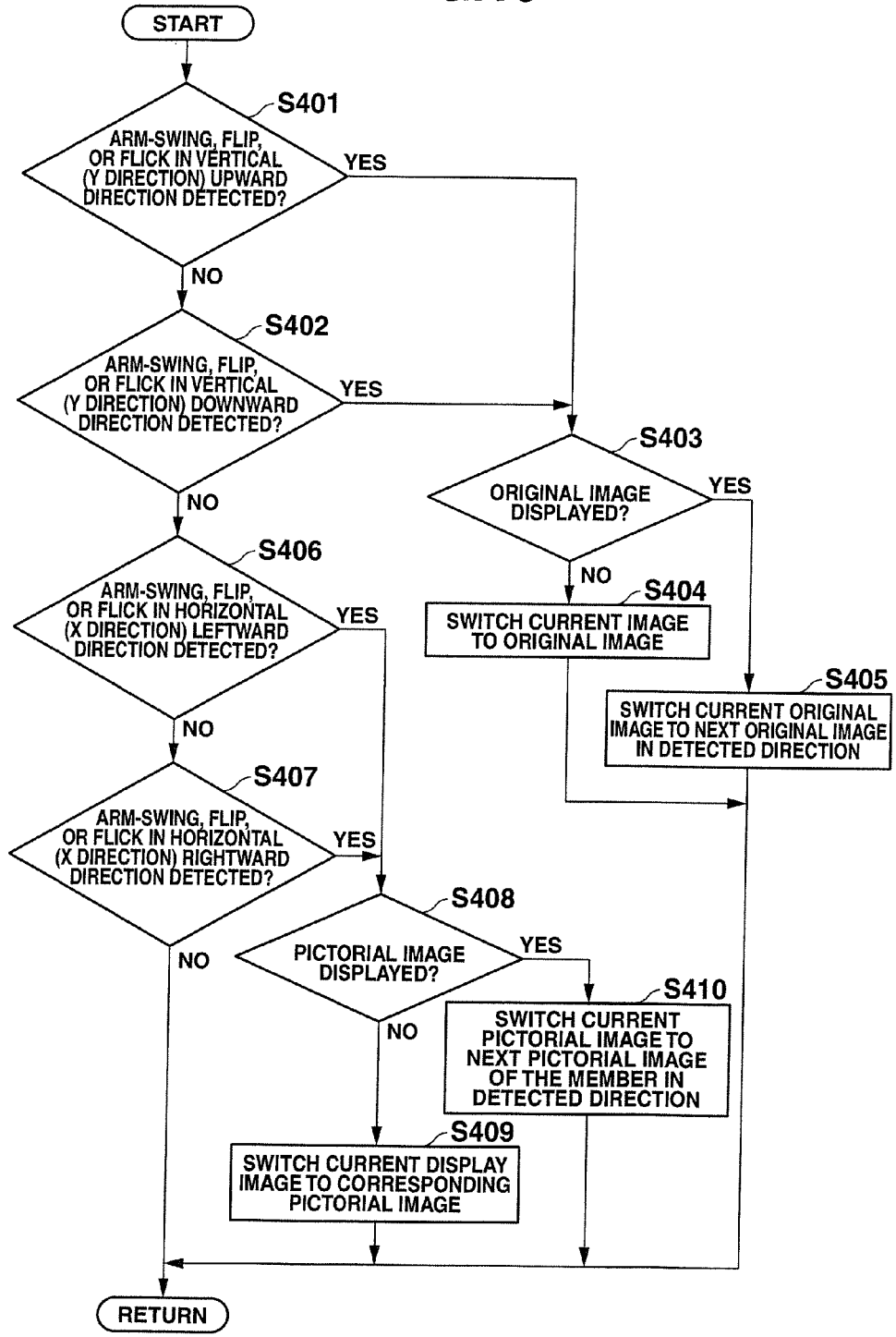
FIG. 19 is a flowchart illustrating a process according to the third embodiment.

FIG. 18 is a diagram illustrating display examples of the wrist terminal 2-1 according to the third embodiment of the present invention. FIG. 19 is a flowchart illustrating a process performed by the wrist terminal 2-1 in the third embodiment.

As shown in the center of FIG. 18, the display 40 of the wrist terminal 2-1 displays a pictorial image WA1 which is a pictorial image work of the member A. In this state, the controller 402 executes processing as illustrated in the flowchart of FIG. 19, in accordance with the program stored in the program storage 403.

Specifically, the controller 402 determines whether any of arm-swing, flip, and flick in a vertical (Y direction in FIG. 18) upward direction has been detected or not (Step S401), or any of arm-swing, flip, and flick in a vertical (Y direction in FIG. 18) downward direction has been detected or not (Step S402), based on the outputs from the acceleration sensor module 408, the inclination sensor module 411, and the touch panel 412.

When any of arm-swing, flip, and flick in the Y direction is detected, it is determined whether the image displayed at present on the display 40 is an original image uploaded by a member or not (Step S403). When the image displayed at present on the display 40 is a pictorial image, not an original image (Step S403; NO), the pictorial image is switched to an original image, from which the pictorial image is obtained by conversion (Step S404).

Thus, in the state where the pictorial image WA1, which has been obtained by subjecting the original image OA of the member A to picture conversion, is displayed on the display 40, when the user swings the arm wearing the wrist terminal 2-1 in the Y direction, inclines the arm in the Y direction, or performs the operation of flicking the surface of the display 40 in the Y direction by the finger, the picture of the display 40 is changed from the pictorial image WA1 to the original image OA, as illustrated in the center part of FIG. 18.

When the image displayed at present on the display 40 is an original image (Step S403; YES), the original image is switched to a next original image in the detected direction (Step S405).

Thus, in the state where the original image OA is displayed on the display 40 as illustrated in the center part of FIG. 18, when the user swings the arm wearing the wrist terminal 2-1 in the Y direction upward, inclines the arm in the Y direction upward, or performs the operation of flicking the surface of the display 40 in the Y direction upward by the finger, the picture of the display 40 is changed from the original image OA of the member A to an original image OB of the next member B, as illustrated in the upper part of FIG. 18. In addition, in the state where the original image OA is displayed on the display 40 as illustrated in the center part of FIG. 18, when the user swings the arm wearing the wrist terminal 2-1 in the Y direction downward, inclines the arm in the Y direction downward, or performs the operation of flicking the surface of the display 40 in the Y direction downward by the finger, the picture of the display 40 is changed from the original image OA of the top member A to an original image OZ of the last member Z, as illustrated in the lower part of FIG. 18.

Further, the controller 402 determines whether any of arm-swing, flip, and flick in a horizontal (X direction in FIG. 18) leftward direction has been detected or not (Step S406), or any of arm-swing, flip, and flick in a horizontal (X direction in FIG. 18) rightward direction has been detected or not (Step S407), based on the outputs from the acceleration sensor module 408, the inclination sensor module 411, and the touch panel 412.

When any of arm-swing, flip, and flick in the X direction is detected, it is determined whether the image displayed at present on the display 40 is a pictorial image or not (Step S408). When the image displayed at present on the display 40 is an original image, not a pictorial image (Step S408; NO), the original image is switched to a corresponding pictorial image (Step S409).

Thus, in the state where the original image OA is displayed on the display 40 as illustrated in the center of FIG. 18, when the user swings the arm wearing the wrist terminal 2-1 in the X direction, inclines the arm in the X direction, or performs the operation of flicking the surface of the display 40 in the X direction by the finger, the picture of the display 40 is changed from the original image OA to a pictorial image WA1 or WA2, which is obtained from the original image OA by conversion.

When the image displayed at present on the display 40 is a pictorial image (Step S408; YES), the pictorial image is switched to a next pictorial image of the member in the detected direction (Step S410).

Thus, in the state where the pictorial image WA1 is displayed on the display 40 as illustrated in the center part of FIG. 18, when the user swings the arm wearing the wrist terminal 2-1 in the X direction leftward, inclines the arm in the X direction leftward, or performs the operation of flicking the surface of the display 40 in the X direction leftward by the finger, the picture of the display 40 is changed from the pictorial image WA1 to a next pictorial image WA2, which is also obtained from the original image OA by conversion, as illustrated in the left part of FIG. 18. In addition, in the state where the pictorial image WA1 is displayed on the display 40 as illustrated in the center part of FIG. 18, when the user swings the arm wearing the wrist terminal 2-1 in the X direction rightward, inclines the arm in the X direction rightward, or performs the operation of flicking the surface of the display 40 in the X direction rightward by the finger, the picture of the display 40 is changed from the pictorial image WA1 to the last pictorial image WAZ, which is also obtained from the original image OA by conversion, as illustrated in the right part of FIG. 18.

Thus, according to the present embodiment, the user can cause the terminal to successively display and scroll works of members, which have been obtained by performing picture conversion for the member's original image which the user likes, even if the terminal has a relatively small display area, such as the wrist terminal 2-1. So, the user can clearly and promptly find pictorial images which the user likes.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. A network service system in which first data of first type is uploaded from a terminal of a member to a server and second data related to the first data and of second type differing from the first type and the first data are viewable by members, wherein the terminal comprises:
 a display with a screen;
 a detector configured to detect a screen change operation in a first direction and a screen change operation in a second direction perpendicular to the first direction; and
 a processor configured to, in a state where only a profile image of the member is displayed on the screen of the display with the profile image being an image of a first type, successively switch the profile image displayed on the screen of the display to a profile image of another member on the screen of the display so that only the profile image of the other member is displayed on the screen of the display when the detector detects the screen change operation in the first direction, and successively switch on the screen of the display the profile image to an image belonging to a member whose profile image is being displayed, as an image of the second type, so that the profile image is no longer displayed on the screen and only the image of the second type is displayed when the detector detects the screen change operation in the second direction, such that profile images of the first type and images belonging to a member whose profile is being displayed of the second type do not appear at the same time on the screen of the display.

2. The network service system according to claim 1, wherein the terminal comprises:
 a first terminal configured to be connected to the server through a network; and
 a second terminal attachable to an arm, configured to be connected to the first terminal by communication and to be connected to the server through the first terminal.

3. A terminal for a network service system in which first data of first type is uploaded from a terminal of a member to a server and second data related to the first data and of second type differing from the first type and the first data are viewable by members, the terminal comprising:
 a display with a screen;
 a detector configured to detect a screen change operation in a first direction and a screen change operation in a second direction perpendicular to the first direction;
 a display controller configured to successively switch and display the first data on the screen of the display when the detector detects the screen change operation in the first direction, and successively switch and display the second data on the screen of the display when the detector detects the screen change operation in the second direction; and
 a processor configured to, in a state where only a profile image of the member is displayed on the screen of the display with the profile image being an image of the first type, successively switch the profile image displayed on the screen of the display to a profile image of another member on the display so that only the profile image of the other member is displayed on the screen of the display when the detector detects the screen change operation in the first direction, and successively switch on the screen of the display the profile image to an image belonging to a member whose profile image is being displayed, as an image of the second type, so that the profile image is no longer displayed on the screen and only the image of the second type is displayed when the detector detects the screen change operation in the second direction, such that profile images of the first type and images belonging to a member whose profile is being displayed of the second type do not appear at the same time on the screen of the display.

4. The network service system according to claim 1, wherein the image belonging to a member is a work subjected to image editing by the member.

5. The terminal according to claim 3, wherein the image belonging to a member is a work subjected to image editing by the member.

6. The terminal according to claim 3, wherein
the terminal is attachable to an arm,
the screen change operation comprises swinging the arm wearing the terminal, and
the detector is configured to detect a swing direction of the arm.

7. The terminal according to claim 3, wherein
the screen change operation comprises inclining the terminal, and
the detector is configured to detect an inclination of the terminal.

8. The terminal according to claim 3, wherein
the screen change operation comprises flicking a screen of the display by a finger, and
the detector is configured to detect a flick direction of the finger.

9. The terminal according to claim 8, wherein
at least one of the first direction and the second direction comprises at least one of a horizontal direction and a horizontal direction of a screen of the display.

10. The terminal according to claim 8, wherein
at least one of the first direction and the second direction comprises an oblique direction crossing at least one of a central vertical axis and a central horizontal axis of a screen of the display.

11. The terminal according to claim 3, comprising:
a first terminal configured to be connected to the server through a network; and
a second terminal attachable to an arm, configured to be connected to the first terminal by communication and to be connected to the server through the first terminal.

12. A display method for a network service system in which first data of first type is uploaded from a terminal of a member to a server and second data related to the first data and of second type differing from the first type and the first data are viewable by members, the terminal comprising a display with a screen, the method comprising:

detecting a screen change operation in a first direction and a screen change operation in a second direction perpendicular to the first direction;
successively switching and displaying the first data on the screen of the display when the screen change operation in the first direction is detected, and successively switching and displaying the second data on the screen of the display when the screen change operation in the second direction is detected; and
in a state where only a profile image of the member is displayed on the screen of the display with the profile image being an image of a first type, successively switching the profile image displayed on the screen of the display to a profile image of another member on the screen of the display so that only the profile image of the other member is displayed on the screen of the display when the screen change operation in the first direction is detected, and successively switch on the screen of the display the profile image to an image belonging to a member whose profile image is being displayed, as an image of the second type, so that the profile image is no longer displayed on the screen and only the image of the second type is displayed when the screen change operation in the second direction is detected, such that profile images of the first type and images belonging to a member whose profile is being displayed of the second type do not appear at the same time on the screen of the display.

13. A non-transitory computer-readable storage medium having stored thereon a computer program which is executable by a computer of a terminal for a network service system in which first data of first type is uploaded from a terminal of a member to a server and second data related to the first type and of second type differing from the first type and the first data are viewable by members, the terminal comprising a display with a screen, the computer program comprising instructions capable of causing the computer to execute functions of:

detecting a screen change operation in a first direction and a screen change operation in a second direction perpendicular to the first direction;
in a state where only a profile image of the member is displayed on the screen of the display with the profile image being an image of a first type, successively switching the profile image displayed on the display to a profile image of another member on the screen of the display so that only the profile image of the other member is displayed on the screen of the display when the screen change operation in the first direction is detected, and successively switching on the screen of the display the profile image to an image belonging to a member whose profile image is being displayed, as an image of the second type, so that the profile image is no longer displayed on the screen and only the image of the second type is displayed when the screen change operation in the second direction is detected, such that profile images of the first type and images belonging to a member whose profile is being displayed of the second type do not appear at the same time on the screen of the display.

* * * * *